E. HOLOFFE.
NUT LOCK.
APPLICATION FILED AUG. 28, 1915.
1,193,789.
Patented Aug. 8, 1916.
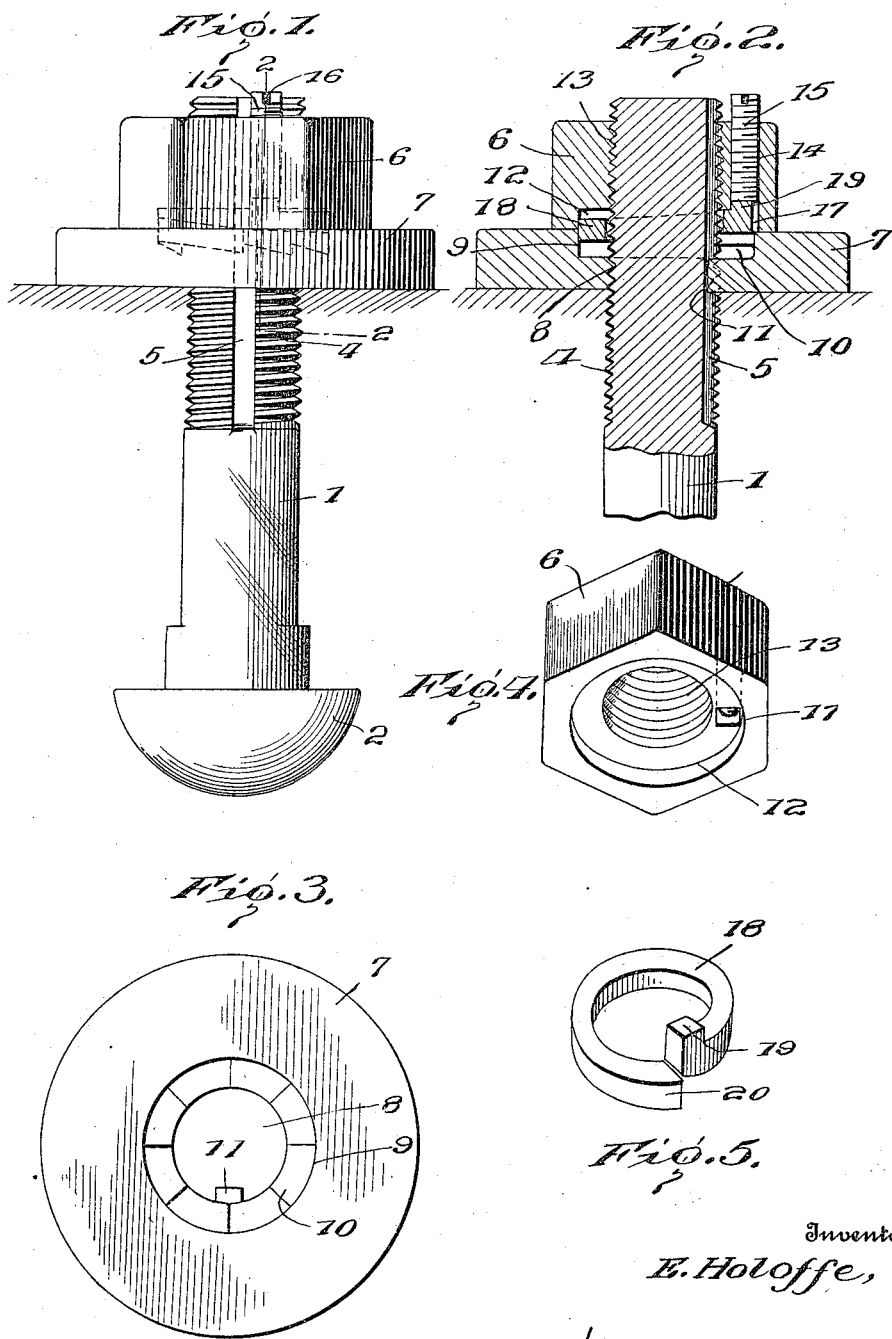
Inventor
E. Holoffe,

UNITED STATES PATENT OFFICE.

EMILE HOLOFFE, OF WEST FRANKFORT, ILLINOIS.

NUT-LOCK.

1,193,789.     Specification of Letters Patent.     Patented Aug. 8, 1916.

Application filed August 28, 1915. Serial No. 47,848.

*To all whom it may concern:*

Be it known that I, EMILE HOLOFFE, a citizen of the United States, residing at West Frankfort, in the county of Franklin and State of Illinois, have invented certain new and useful Improvements in Nut-Locks, of which the following is a specification.

This invention relates to nut locks and has as one of its aims to provide a nut lock in which the locking elements will be housed and protected from the elements and as another aim to provide a nut lock so constructed that the nut may be readily loosened or removed whenever desired so that the locking device or, the device, in connection with the nut and bolt, may be repeatedly used and destruction of any element of the locking means will be obviated.

In the accompanying drawings: Figure 1 is a side elevation of one form of nut lock embodying the present invention. Fig. 2 is a vertical sectional view therethrough taken substantially on the line 2—2 of Fig. 1. Fig. 3 is a face view of the washer shown in Figs. 1 and 2. Fig. 4 is a perspective view of the nut shown in the said figures. Fig. 5 is a perspective view of the locking element or washer of the device.

Corresponding and like parts are indicated in all the views of the accompanying drawings by the same reference characters.

In the drawings the bolt is indicated by the numeral 1 and is provided at one end of its shank with the usual head 2 and its shank is threaded in the usual manner, as indicated at 4; and formed with a longitudinally extending groove 5. The nut which is threaded upon the bolt is indicated at 6 and the washer against which the nut bears is indicated at 7. The washer 7 is provided with the usual bolt opening 8 and surrounding the bolt opening is formed in one face with an annular recess 9, the inner wall of which is of ratchet formation, as indicated at 10. The wall of the opening 8 is formed with a lug 11 which slidably fits within the groove 5 of the bolt so that the washer may be fitted to the bolt and adjusted longitudinally thereof so as to be brought to bear against an element to be secured by the bolt and nut. The engagement of the lug 11 in the groove 5 serves of course to prevent rotation of the washer 7 with relation to the bolt. The nut 6 is formed in that face which is designed to abut against the washer 7 with an annular groove 12 which surrounds the usual bolt opening formed in the nut, this opening being indicated by the numeral 13. The nut 6 is further formed parallel to the axis of its bolt opening 13 with a threaded bore 14 in which is adjustably threaded a screw 15 which may or may not be provided with a head, as found desirable, the outer end of this screw being provided in the present instance with a transverse slot 16 for the engagement of any suitable tool for the purpose of adjusting the said screw. The bore 14 opens at one end at that face of the nut opposite the face in which the recess 12 is formed and at its inner end the bore communicates with the said recess, as indicated at 17 in Figs. 2 and 4 of the drawings, this latter end of the bore constituting a socket for a purpose to be hereinafter explained. The locking washer or element of the device comprises a split spiral resilient member 18 provided at one end with a lug 19 which projects laterally therefrom.

In assembling the several elements comprising the structure above described, the bolt is fitted through the element or elements to be secured and the washer 7 is fitted onto the bolt and slid longitudinally thereon until brought to position resting against the face of the said element. The locking member 18 is then fitted onto the bolt and its end, indicated at 20 in Fig. 5 of the drawings, is brought into engagement with the ratchet teeth 10 within the recess 9 in the washer 7. The nut 6 is then threaded onto the bolt in the usual manner until the lug 19 of the said locking element engages in the end 17 of the bore 14, or, in other words, in the socket above mentioned. The nut is then tightened and as it is thus further rotated the end 20 of the locking element will ride over the ratchet teeth 10 and will eventually engage at its end 20 behind the shoulder of one of the teeth. Before thus assembling the parts, the screw 15 is threaded back a sufficient distance to permit the lug 19 to enter the said socket 17, as will be readily understood, and with the parts in this position any backward rotation of the bolt with respect to the nut by engagement of the said lug 19 in the socket and the engagement of the lug 19 in the locking element with the ratchet teeth 10 will be prevented. At this point, it will be observed, and particularly by reference to Figs. 1 and 2 of the drawings, that the ratchet teeth lie wholly within the recess 9 and, in fact are spaced inwardly a considerable distance from that face of the washer 7 in which the said recess is formed, and by reason of this construction, the end of the lug 19 may engage against the inner wall of the recess 12 in the nut without the opposite side or face of the element 18 injuring the ratchet teeth 10 and without binding the parts in such manner as to prevent backward rotation of the nut under conditions which will now be explained. When it becomes necessary or desirable to remove or loosen the nut 6, the screw 16 is threaded inwardly until its inner end is flush with the inner wall of the recess 12 in the nut, and in thus manipulating the screw the end of the lug 19 will be brought into the same plane as that occupied by the said inner wall of the recess 12, and the nut may then be rotated backwardly in the manner stated.

Having thus described the invention, what is claimed as new is:

In a device of the class described, a bolt, a washer held against rotation with relation to the bolt and provided with a series of ratchet teeth surrounding its bolt opening, a nut threaded upon the bolt and provided in its face which is to contact the washer with an annular recess surrounding the bolt opening in the nut, the inner wall of the recess being plane, the said nut being provided with a threaded bore extending parallel to its axis and opening through the said inner wall of the recess and the said wall of the recess having a seat formed therein at the inner end of the bore and of substantially the same dimensions as the said bore, a spiral lock washer fitted to the bolt and having an end coöperating with the ratchet teeth of the first mentioned washer and provided at its other end with a projection designed to engage within the said seat in the inner wall of the recess in the nut and to substantially fill the same, and a screw threaded into the said bore in the nut and adjustable to have its inner end lie inwardly of the seat to permit of engagement of the said projection in the seat and also adjustable to force the said projection from engagement in the seat and to have its inner end substantially close the seat and lie substantially flush with the said inner wall of the recess whereby in such adjusted position of the said screw the nut may be freely rotated with relation to the said lock washer.

In testimony whereof I affix my signature in presence of two witnesses.

EMILE HOLOFFE. [L. S.]

Copies of this patent may be obtained for five cents each, by addressing the "Commissioner of Patents, Washington, D. C."